(12) United States Patent
Gunnerman et al.

(10) Patent No.: US 8,203,027 B2
(45) Date of Patent: Jun. 19, 2012

(54) CONTINUOUS PROCESS AND PLANT DESIGN FOR CONVERSION OF BIOGAS TO LIQUID FUEL

(76) Inventors: Rudolf W. Gunnerman, Reno, NV (US); Peter W. Gunnerman, Reno, NV (US)

( * ) Notice: Subject to any disclaimer, the term of this patent is extended or adjusted under 35 U.S.C. 154(b) by 151 days.

(21) Appl. No.: 12/852,724

(22) Filed: Aug. 9, 2010

(65) Prior Publication Data

US 2010/0324349 A1    Dec. 23, 2010

Related U.S. Application Data

(62) Division of application No. 12/212,968, filed on Sep. 18, 2008, now Pat. No. 7,897,124.

(51) Int. Cl.
*C07C 2/00* (2006.01)

(52) U.S. Cl. .......... 585/700; 585/14; 585/240; 585/250; 585/638; 585/640; 585/709; 585/717; 585/752; 48/127.3; 48/197 FM

(58) Field of Classification Search .............. 585/14, 585/700, 240, 250, 638, 640, 709, 717, 752; 48/127.3, 197 FM
See application file for complete search history.

(56) References Cited

U.S. PATENT DOCUMENTS

| 5,315,054 A * | 5/1994 | Teel ............................. 585/14 |
| 7,806,947 B2 | 10/2010 | Gunnerman et al. |
| 7,880,044 B2 | 2/2011 | Gunnerman et al. |
| 7,897,124 B2 | 3/2011 | Gunnerman et al. |
| 2009/0249682 A1 | 10/2009 | Gunnerman et al. |
| 2011/0000128 A1 | 1/2011 | Gunnerman et al. |
| 2011/0049014 A1 | 3/2011 | Gunnerman et al. |
| 2011/0163007 A1 | 7/2011 | Gunnerman et al. |

FOREIGN PATENT DOCUMENTS

WO    WO 2011/025613 A1    3/2011

* cited by examiner

*Primary Examiner* — Prem C Singh
(74) *Attorney, Agent, or Firm* — Kilpatrick Townsend & Stockton LLP.; M. Henry Heines

(57) ABSTRACT

Biogases such as natural gas and other gases capable of being biologically derived by digestion of organic matter are converted to a clean-burning hydrocarbon liquid fuel in a continuous process wherein a biogas is fed to a reaction vessel where the biogas contacts a liquid petroleum fraction and a transition metal catalyst immersed in the liquid, vaporized product gas is drawn from a vapor space above the liquid level, condensed, and fed to a product vessel where condensate is separated from uncondensed gas and drawn off as the liquid product fuel as uncondensed gas is recycled to the reaction vessel.

10 Claims, 1 Drawing Sheet

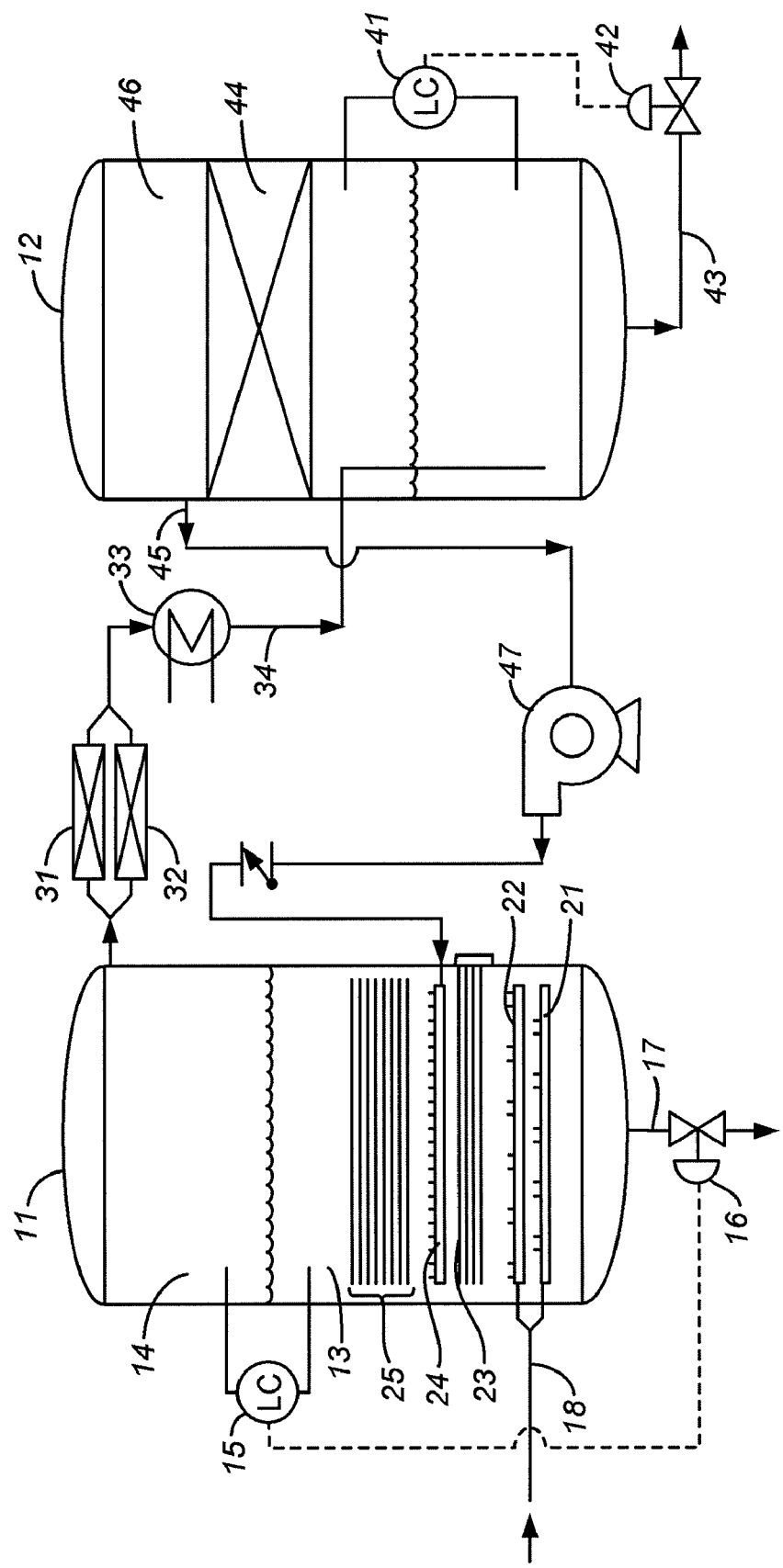

CONTINUOUS PROCESS AND PLANT DESIGN FOR CONVERSION OF BIOGAS TO LIQUID FUEL

CROSS REFERENCE TO RELATED APPLICATION

This application is a division of application no. 12/212,968, filed Sep. 18, 2008, now U.S. Pat. No. 7,897,124, the contents of which are incorporated herein by reference.

BACKGROUND OF THE INVENTION

1. Field of the Invention

This invention lies in the field of biogas and its use as a source of energy, and also in the field of chemical plant design for conversion of biogas to liquid fuel.

2. Description of the Prior Art

Alternative sources of energy are in ever increasing demand as crude oil fluctuates in price and as governments and the public at large become increasingly concerned over adverse environmental impacts of gaseous emissions from the processing of crude oil. A major group of alternatives to crude oil are the gases commonly known as "biogas" which refers generally to gases resulting from the decomposition of organic matter in the absence of oxygen. The decomposition can occur in disposal facilities for treating municipal waste and waste products in general, and the decomposition processes generally include anaerobic digestion and fermentation of biodegradable materials such as biomass, manure, sewage, municipal waste, and energy crops. The decomposition can also occur naturally in geological formations. Depending on its source, biogas can include hydrogen, methane, and carbon monoxide, as well as relatively benign gases such as nitrogen and carbon dioxide. Natural gas is one form of biogas.

A co-pending United States patent application of potential relevance to the present invention is Application No. 12/171,801, filed Jul. 11, 2008 as a continuation-in-part of Application No. 12/098,513, filed Apr. 7, 2008. The contents of both such applications as they relate to conversion of biogas to liquid hydrocarbon fuel are incorporated herein by reference.

SUMMARY OF THE INVENTION

The present invention resides in a process scheme for converting biogas to a clean-burning liquid fuel (i.e., a liquid fuel that upon combustion produces a gaseous combustion product that is at least substantially free of particulate emissions and odor), and particularly a liquid hydrocarbon fuel, and to a processing plant designed to implement the scheme. The process scheme and plant operate in a continuous mode, and the features of the scheme and plant include a gas-liquid reaction vessel and a product vessel, with a gas feed to the reaction vessel for inlet biogas and a port on the product vessel from which to draw liquid product. Fluid transfer conduits connect the two vessels, including one such conduit transferring vaporized product from the reaction vessel through a condenser and then to the product vessel, and another such conduit transferring uncondensed gas from the product vessel back to the reaction vessel. Mounted inside the reaction vessel are a grid of transition metal catalyst and gas distributors for both the feed gas and the recycle gas, both under the liquid level. Optional features include a supplementary gas-phase reaction vessel downstream of the gas-liquid reaction vessel and upstream of the condenser, the supplementary vessel itself containing a grid of transition metal catalyst to react unreacted materials in the stream of vaporized product emerging from the reaction vessel. Further features of the plant are described below.

The reaction medium in the gas-liquid reaction vessel is a liquid petroleum fraction, and the liquid product emerging from the product vessel is a hydrocarbon fuel of a composition that is distinct from the liquid petroleum fraction. The plant is operated on a continuous basis, and the reaction can be performed for a prolonged period of time, continuously producing product without adding further quantities of liquid petroleum fraction to the reaction vessel, although such further quantities can be added as needed to supplement the liquid level or compensate for liquid that has been entrained with the vaporized product. In either case, the product is readily produced in a volume that far exceeds the starting volume of the liquid petroleum fraction.

These and other objects, advantages, and features of the invention are included in the descriptions below.

BRIEF DESCRIPTION OF THE DRAWING

The FIGURE is a process flow diagram embodying an example of an implementation of the invention.

DETAILED DESCRIPTION OF THE INVENTION AND PREFERRED EMBODIMENTS

The term "biogas" is used herein to include any non-inert gas that can be produced by the biological degradation of organic matter. As noted above, prime examples of biogas are hydrogen, methane, and carbon monoxide, although other gaseous petroleum-based products such as ethane and ethylene, and decomposition products of agricultural waste such as wood chips, grains, grasses, leaves, and the like, are likewise included within the scope of the teem. The term is also used herein to include the same gases that are obtained from other sources. One example is methane associated with coal, commonly known as "coal bed methane," "coal mine methane," and "abandoned mine methane." Such methane can be derived by bacterial activity or by heating. Gases containing 90% to 100% methane on a mole percent basis are of particular interest, and this includes natural gas, of which methane typically constitutes approximately 95 mole percent.

The petroleum fraction in the liquid reaction medium in the process of this invention includes fossil fuels, crude oil fractions, and many of the components derived from these sources. The fossil fuels include any carbonaceous liquids that are derived from petroleum, coal, or any other naturally occurring material, as well as processed fuels such as gas oils and products of fluid catalytic cracking units, hydrocracking units, thermal cracking units, and cokers. Included among these fuels are automotive fuels such as gasoline, diesel fuel, jet fuel, and rocket fuel, as well as petroleum residuum-based fuel oils including bunker fuels and residual fuels. Fractions or products in the diesel range can also be used, such as straight-run diesel fuel, feed-rack diesel fuel (diesel fuel that is commercially available to consumers at gasoline stations), light cycle oil, and blends of straight-run diesel and light cycle oil. Crude oil fractions include any of the various refinery products produced from crude oil, either by atmospheric distillation or by vacuum distillation, as well as fractions that have been treated by hydrocracking, catalytic cracking, thermal cracking, or coking, and those that have been desulfurized. Examples of such fractions are light straight-run naphtha, heavy straight-run naphtha, light steam-cracked naphtha, light thermally cracked naphtha, light catalytically cracked naphtha, heavy thermally cracked naphtha, reformed naphtha, alkylate naphtha, kerosene, hydrotreated kerosene, gasoline and light straight-run gasoline, straight-run diesel, atmospheric gas oil, light vacuum gas oil, heavy vacuum gas oil, residuum, vacuum residuum, light coker gasoline, coker distillate, FCC (fluid catalytic cracker) cycle oil, and FCC slurry oil. Preferred reaction media are mineral oil, diesel oil, naphtha, kerosene, gas oil, and gasoline.

The transition metal catalyst can be any single transition metal or combination of transition metals, either as metal salts, pure metals, or metal alloys, and can also be used in combination with metals other than transition metals. Preferred catalysts for use in this invention are metals and metal alloys. Transition metals having atomic numbers ranging from 23 to 79 are preferred, and those with atomic numbers ranging from 24 to 74 are more preferred. Cobalt, nickel, tungsten, and iron, particularly in combination, are the most preferred. An example of an additional metal that can be included is aluminum.

The metallic catalyst is used in solid form and is preferably maintained below the liquid level in the reaction vessel as the biogas is bubbled through the liquid and through or past the catalyst. The catalyst can assume any form that allows intimate contact with both the liquid petroleum fraction and the biogas and allows free flow of gas over and past the catalyst. Examples of suitable forms of the catalyst are pellets, granules, wires, mesh screens, perforated plates, rods, and strips. Granules and wires suspended across plates or between mesh matrices such as steel or iron wool are preferred for their relatively accessible high surface area. When granules are used, the granules can be maintained in a fluidized state in the reaction medium or held stationary in the form of a fixed bed. When wires are used, individual cobalt, nickel, aluminum, and tungsten wires, for example, of approximately equal diameter and length, and be strung across a frame of cast iron to form an open-mesh network which can then be supported inside the reactor. A reactor can contain a single frame strung with wires in this manner or two or more such frames, depending on the size of the reactor. A still further variation of the catalyst configuration that can be used is a coil or other wrapping of the metallic wire around or over piping that serves as a gas distributor for incoming gas. As mentioned above in the "SUMMARY OF THE INVENTION," the reaction vessel will typically contain one or more gas distributors for incoming gas, and in certain embodiments of the invention as explained below, the distributor(s) may have a wheel-and-spokes configuration or any other shape that includes a network of hollow pipes with an array of apertures to form the gas into small bubbles for release into the reaction vessel. These pipes, or at least the apertures, can be covered for example with a steel mesh or steel wool in combination with wires of the various metals listed above, to intercept the gas bubbles before they enter the reaction medium. The term "metallic grid" is used herein to denote any fixed form of metallic catalyst that is submerged in the reaction medium and allows gas to bubble through the grid. The term thus encompasses fixed (as opposed to fluidized) beds, screens, open-weave wire networks, and any other forms described above. The metal can be in bare form or supported on inert supports as ceramic coatings or laminae.

The reaction is performed under non-boiling conditions to maintain the liquid petroleum fraction used as the reaction medium in a liquid state and to avoid or at least minimize the amount of the liquid that is vaporized and leaves the reaction vessel with the product. An elevated temperature, i.e., one above ambient temperature, is used, preferably one that is about 80° C. or above, more preferably one within the range of about 100° C. to about 250° C., and most preferably from about 100° C. to about 150° C. The operating pressure can vary as well, and can be either atmospheric, below atmospheric, or above atmospheric. The process is readily and most conveniently performed at either atmospheric pressure or a pressure moderately above atmospheric. Preferred operating pressures are those within the range of 1 atmosphere to 2 atmospheres.

The supplementary gas-phase reaction vessel referenced above as an optional feature of the invention is a flow-through vessel with a grid of metallic catalyst, in which the term "grid" has the same scope of meaning as stated above in connection with the gas-liquid reaction vessel. In the supplementary vessel, however, the grid is not submerged in a liquid but instead supported within the vessel in the path of the vaporized product emerging from the gas-liquid reaction vessel. The metals in the grid can be the same as those in the grid of the gas-liquid reaction vessel, or different combinations of transition metals.

A process flow diagram representing one example of a plant design for implementation of the present invention is presented in the attached FIGURE. The reaction vessel 11 and the product vessel 12 are both shown. Each of these vessels is a closed cylindrical tank with a volumetric capacity of 2,000 gallons (U.S.) (7,570 cubic meters). The reaction vessel 11 is charged with a petroleum fraction used as a liquid reaction medium 13 with a gaseous head space 14 above the liquid. The liquid level is maintained by a level control 15 which is actuated by a pair of float valves inside the vessel. The level control 15 governs a motor valve 16 on a drain line 17 at the base of the vessel.

Biogas is fed to the reaction vessel 11 underneath the liquid level at an inlet gas pressure of from about 5 psig to about 20 psig, through a gas inlet line 18 which is divided among two gas distributors 21, 22 inside the reactor vessel, each distributor being large enough to deliver 1,000 scfm of gas to the vessel. Each distributor spans substantially the full cross section of the vessel in either a grid configuration, a wheel-and-spokes configuration, or any other configuration that will support an array of outlet ports distributed across the cross section of the vessel. While two distributors are shown, the optimal number of distributors and outlet ports and the optimal configuration for any individual distributor will be readily determinable by routine experimentation, with greater or lesser numbers of distributors being optimal for reactor vessels of different capacities. A resistance heater 23 is positioned in the reactor above the gas distributors, and a third gas distributor 24 is positioned above the resistance heater. The third gas distributor 24 receives return gas from the product receiving vessel 12 as explained below. The resistance heater 23 maintains the liquid at a temperature of approximately 240-250° F. (116-121° C.).

Positioned above the three gas distributors 21, 22, 24 and the resistance heater 23 but still beneath the liquid level are a series of catalyst grids 25 arranged in a stack. Each grid is a circular ring or apertured plate with metallic catalyst wires strung across the ring and supported by pegs affixed to the ring along the ring periphery. Of the variety of metals that can be used for the ring and the pegs, one example is a cast iron ring and chromium pegs. The sizes of the wires and the total length of each wire will be selected to achieve the maximal surface area exposed to the reaction medium while allowing gas to bubble through, and will be readily apparent to anyone skilled in the use of metallic or other solid-phase catalysts in a liquid-phase or gas-phase reaction. One example of a wire size is 1 mm in diameter. Using individual wires of each of four metals, such as for example cobalt, nickel, aluminum, and tungsten, two pounds of each metal wire can be used per ring, or eight pounds total per ring. The number of rings can vary, and will in most cases be limited only by the size of the reactor, the gas flow rate into the reactor, the desirability of maintaining little or minimal pressure drop across the rings, and economic factors such as the cost of materials. In a preferred embodiment, seven rings are used, each wound with the same number and weight of wires. The reaction can also be enhanced by placing screens of wire mesh between adjacent plates to assure that the gas bubbles contacting the catalyst wires are of a small size. Screens that are 40-mesh (U.S. Sieve Series) of either stainless steel or aluminum will serve this purpose.

Product gas is drawn from the head space 14 of the reaction vessel 11 and passed through a supplementary catalyst bed of the same catalyst material as the catalyst rings 25 of the reaction vessel. In the diagram shown, two such catalyst beds 31, 32 of identical construction and catalyst composition are arranged in parallel. The supplementary catalyst can be in the form of metallic wire screens, grids, or perforated plates similar to those of the catalyst grids 25 in the reactor vessel 11. The supplementary catalyst promotes the same reaction that occurs in the reaction vessel 11 for any unreacted materials that have been carried over with the product gas drawn from the reaction vessel. Product gas emerging from the supplementary catalyst beds is passed through a condenser 33 and the resulting condensate 34 is directed to the product vessel 12 where it is introduced under the liquid level.

The liquid level in the product vessel 12 is controlled by a level control 41 which is actuated by a pair of float valves inside the vessel and governs a motor valve 42 on a liquid product outlet line →at the base of the vessel. Above the liquid level is a packed bed 44 of conventional tower packings. Examples are Raschig rings, Pall rings, and Intalox saddles; other examples will be readily apparent to those familiar with distillation towers and column packings. The packing material is inert to the reactants and products of the system, or at least substantially so, and serves to entrap liquid droplets that may be present in the gas phase and return the entrapped liquid back to the bulk liquid in the lower portion of the vessel. Unreacted gas 45 is withdrawn from the head space 46 above the packed bed by a gas pump 47. The pump outlet is passed through a check valve 48 and then directed to the reaction vessel 11 where it enters through the gas distributor 24 positioned between the resistance heater 23 and the catalyst grids 25.

Alternatives to the units described above and shown in the FIGURE will be readily apparent to the skilled chemical engineer. For example, any known type of condenser can be used to condense the vaporized product from the reaction vessel. Examples of types of condensers are shell-and-tube condensers and plate-and-frame condensers, and among the shell-and-tube condensers are horizontal tube condensers and vertical tube condensers. Either co-current or counter-current condensers can be used, and the condensers can be air-cooled, water-cooled, or cooled by organic coolant media such as automotive anti-freeze (for example, 50% pre-diluted ethylene glycol) and other glycol-based coolants. Alternatives to the resistance heater are heating jackets, heating coils using steam or other heat-transfer fluids, and radiation heaters. Heating of the reaction vessel can also be achieved, either in part or in whole, by recirculation of heat transfer fluid between the coolant side of the condenser and the reaction vessel. The gas distributors for the inlet feed and the recycle gas can be any of a variety of types known in the art. Examples are perforated plates, cap-type distributors, and pipe distributors. The liquid level controls can likewise be any of a variety of mechanisms known in the art. Examples are float-actuated devices, devices measuring hydrostatic head, electrically actuated devices such as those differentiating liquid from gas by electrical conductivity or dielectric constant, thermally actuated devices such as those differentiating by thermal conductivity, and sonic devices based on sonic propagation characteristics.

EXAMPLE

This example illustrates the use of the present invention in a processing system in which the feed biogas was methane and the liquid petroleum fraction used in the reaction vessel was diesel fuel. The equipment was a pilot version of the plant set forth in the FIGURE and described above, with a catalyst bed of aluminum wire, cobalt wire (an alloy containing approximately 50% cobalt, 10% nickel, 20% chromium, 15% tungsten, 1.5% manganese, and 2.5% iron), nickel wire, tungsten wire, and cast iron granules. The reaction vessel was 19 inches (0.5 meter) in diameter and initially charged with ten gallons (39 liters) of diesel fuel. The diesel fuel was maintained at a temperature of 240-250° F. (116-121° C.) and a pressure of 3 psig (122 kPa) as the methane was bubbled through the reactor. After startup, the reactor was run for ten hours, then continued for another 2.5 hours during which time product was collected for analysis. The volume of product collected was 5.6 liters, and upon completion of the collection, the volume of liquid reaction medium remained at 8-10 gallons (30-39 liters). The product was analyzed by standard ASTM protocols and the results are listed below.

| Product Test Results | | | |
|---|---|---|---|
| | Protocol | Result | |
| Flash Point | ASTM D 93 | 202° F. (94° C.) | |
| API Gravity at 60° F. (15.6° C.) | ASTM D 287 | 34.8° | |
| | | Percent Recovered: | Result |
| Distillation at 760 mm Hg (1 atm) | ASTM D 86 | Initial b.p. | 423° F. (217° C.) |
| | | 5 | 452.5° F. (234° C.) |
| | | 10 | 464.7° F. (240° C.) |
| | | 20 | 475.5° F. (246° C.) |
| | | 30 | 485.4° F. (252° C.) |
| | | 40 | 495.1° F. (257° C.) |
| | | 50 | 505.2° F. (263° C.) |
| | | 60 | 516.0° F. (269° C.) |
| | | 70 | 527.5° F. (275° C.) |
| | | 80 | 541.6° F. (283° C.) |
| | | 90 | 560.8° F. (294° C.) |
| | | 95 | 580.3° F. (305° C.) |
| | | End | 597.9° F. (314° C.) |
| | | Recovery | 98.1% |
| | | Residue | 1.0% |
| | | Loss | 0.9% |
| | | Pressure | 765 mm Hg |

-continued

Product Test Results

| | Protocol | Result | |
|---|---|---|---|
| Estimated hydrogen content | ASTM D 3343 | 13.38 | weight % |
| Particulate Matter | ASTM D 2276 | 2-0.8 μm filters | 8.5 mg/gal |
| | | Volume | 0.26 gal |
| | | Vacuum | 28.3 in. Hg |
| | | Time | 10 min |
| Total Aromatics | ASTM D 1319 | 18.0 | volume % |
| Sediment and Water | ASTM D 2709 | 0 | volume % |
| Ash | ASTM D 482 | 0.002 | weight % |
| Copper Corrosion (3 hours at 122° F., 50° C.) | ASTM D 130 | 1a | |
| Ramsbottom Carbon Residue, 10% Bottoms | ASTM D 524 | 0.07 | weight % |
| Ramsbottom Carbon Residue | ASTM D 524 | 0 | weight % |
| Lead | ASTM D 3605 | <0.1 | ppm |
| Vanadium | ASTM D 3605 | <0.1 | ppm |
| Calcium | ASTM D 3605 | <0.1 | ppm |
| Sodium, Potassium, Lithium | ASTM D 3605 | <0.1 | ppm |
| Demulsification | ASTM D 1401 | 5 | minutes |
| Sulfur by X-ray | ASTM D 2622 | 0.0005 | weight % |
| Cetane Number | ASTM D 613 | 46.4 | |
| Gross Heat of Combustion | ASTM D 240 | 19,547 BTU/lb, 138,490 BTU/gal | |

The product was fed to a VAL6 Infrared Oil Heater (Shizuoka Seiki Co., Ltd., Japan) where it burned readily in air, emitting neither odor nor smoke.

In the claims appended hereto, the term "a" or "an" is intended to mean "one or more." The term "comprise" and variations thereof such as "comprises" and "comprising," when preceding the recitation of a step or an element, are intended to mean that the addition of further steps or elements is optional and not excluded. All patents, patent applications, and other published reference materials cited in this specification are hereby incorporated herein by reference in their entirety. Any discrepancy between any reference material cited herein and an explicit teaching of this specification is intended to be resolved in favor of the teaching in this specification. This includes any discrepancy between an art-understood definition of a word or phrase and a definition explicitly provided in this specification of the same word or phrase.

What is claimed is:

1. A continuous process for producing liquid fuel from a biogas containing 90 mole % to 100 mole % methane, said process comprising:
   (a) feeding said biogas to a reaction vessel partially filled with a liquid petroleum fraction to a first externally controlled liquid level to cause said biogas to bubble through said liquid petroleum fraction and through a metallic grid of at least one catalytic transition metal immersed in said liquid, while maintaining said body of liquid at a temperature of at least about 80° C. but below boiling;
   (b) passing a gaseous reaction product mixture from a head space in said reaction vessel above said liquid level through a condenser to convert said gaseous reaction product mixture to liquid condensate and uncondensed gas;
   (c) passing said liquid condensate and uncondensed gas into a product vessel having a second externally controlled liquid level, to separate said liquid condensate from said uncondensed gas; and
   (d) drawing from said product vessel said liquid condensate so separated as said liquid fuel while recycling said uncondensed gas from said product vessel to said reaction vessel by directing said uncondensed gas below said first liquid level and through said first metallic grid;
   steps (a) through (d) being performed continuously and simultaneously.

2. The continuous process of claim 1 wherein said metallic grid in said reaction vessel is defined as a first metallic grid, said process further comprising passing said gaseous reaction product mixture through a second metallic grid of at least one catalytic transition metal prior to said condenser.

3. The continuous process of claim 2 wherein said second metallic grid is external to said reaction vessel and said product vessel.

4. The continuous process of claim 1 further comprising passing said uncondensed gas through a fixed bed of inert packing material to recover entrained liquid therein prior to recycling said uncondensed gas to said reaction vessel.

5. The continuous process of claim 1 wherein said at least one catalytic transition metal constituting said first metallic grid is a plurality of transition metals with atomic numbers within the range of 24 to 74.

6. The continuous process of claim 1 wherein said at least one catalytic transition metal constituting said second metallic grid is a plurality of transition metals with atomic numbers within the range of 24 to 74.

7. The continuous process of claim 1 wherein said at least one catalytic transition metal constituting said first metallic grid and said at least one catalytic transition metal constituting said first metallic grid are both pluralities of metals comprising cobalt, nickel, and tungsten.

8. The continuous process of claim 1 comprising maintaining said body of liquid at a temperature of from about 100° C. to about 250° C. in step (a).

9. The continuous process of claim 1 comprising maintaining said body of liquid at a temperature of from about 100° C. to about 150° C. in step (a).

10. The continuous process of claim 1 wherein said biogas is natural gas.

* * * * *